United States Patent
Kelly et al.

(10) Patent No.: US 9,592,721 B1
(45) Date of Patent: Mar. 14, 2017

(54) VEHICLE DOOR STRUCTURE

(71) Applicant: Nissan North America, Inc., Franklin, TN (US)

(72) Inventors: Jeremy Kelly, Detroit, MI (US); Aaron Tenorio, South Lyon, MI (US); Raymond Lipp, Whitmore Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/010,357

(22) Filed: Jan. 29, 2016

(51) Int. Cl.
*B60J 5/04* (2006.01)

(52) U.S. Cl.
CPC ........... *B60J 5/0425* (2013.01); *B60J 5/0402* (2013.01); *B60J 5/0413* (2013.01); *B60J 5/0422* (2013.01)

(58) Field of Classification Search
CPC . B60J 5/04; B60J 5/0412; B60J 5/0413; B60J 5/042; B60J 5/0422; B60J 5/0423; B60J 5/0425; B60J 5/0429; B60J 5/0431; B60J 5/0437; B60J 5/0444; B60J 5/0443; B60J 5/0458; B60J 5/0456; B60J 5/0461
USPC ...................................................... 296/146.6
See application file for complete search history.

(56) References Cited

U.S. PATENT DOCUMENTS

| | | | | |
|---|---|---|---|---|
| 5,123,694 A | * | 6/1992 | DePierre | B60J 5/0437 296/187.12 |
| 5,404,690 A | * | 4/1995 | Hanf | B60J 5/0437 29/897.2 |
| 5,813,719 A | * | 9/1998 | Kowalski | B60J 5/0444 296/146.6 |
| 8,491,047 B1 | | 7/2013 | Moll | |
| 8,851,553 B2 | * | 10/2014 | Rakei | B60J 5/0444 296/146.6 |
| 8,973,971 B1 | * | 3/2015 | Henke | B60J 5/0444 296/146.6 |
| 2005/0017538 A1 | * | 1/2005 | Omori | B60J 5/0411 296/146.6 |
| 2012/0091750 A1 | * | 4/2012 | Danaj | B60J 5/0443 296/146.6 |
| 2013/0147229 A1 | * | 6/2013 | Han | B60J 5/0437 296/146.6 |
| 2014/0191535 A1 | * | 7/2014 | Sugiyama | B62D 25/16 296/193.05 |
| 2014/0375078 A1 | * | 12/2014 | Fujihara | B60J 5/0443 296/146.6 |
| 2015/0367715 A1 | * | 12/2015 | Inamoto | B60J 5/0429 296/146.6 |

* cited by examiner

*Primary Examiner* — Gregory Blankenship
(74) *Attorney, Agent, or Firm* — Global IP Counselors, LLP

(57) ABSTRACT

A vehicle door structure having an inner door panel and a reinforcing structure. The inner door panel has a main upright portion, a front wall portion, a rear wall portion and a lower wall portion extending horizontally along a lower area of the main upright portion from a lower end of the front wall portion to a lower end of the rear wall portion. The reinforcing structure extends between the front wall portion and the rear wall portion. The reinforcing structure includes a first bracket fixed to at least one of the front wall portion and the main upright portion of the inner door panel and a reinforcing bar having a first end section rigidly fixed to the first bracket. The first end section of the reinforcing bar has a contoured end surface that is spaced apart from adjacent surfaces of the first bracket.

15 Claims, 8 Drawing Sheets

VEHICLE DOOR STRUCTURE

BACKGROUND

Field of the Invention

The present invention generally relates to a vehicle door structure. More specifically, the present invention relates to vehicle door structure having a first bracket and a reinforcing bar with a contoured end surface that is spaced apart from adjacent surfaces of the first bracket in an undeformed state, the contoured end surface being shaped to maximize surface area contact between the first end section of the reinforcing bar and the adjacent surfaces of the first bracket in response to a force being applied to the reinforcing bar and causing the first bracket to deform.

Background Information

Many areas of a vehicle body structure are provided with reinforcing structures. For example, vehicle doors usually include reinforcing structures.

SUMMARY

One object of the objects of the present disclosure is to provide a reinforcement structure of a vehicle door with improved response to side force and deformation testing.

In view of the state of the known technology, one aspect of the present disclosure is to provide a vehicle door structure with an inner door panel and a reinforcing structure. The inner door panel has a main upright portion, a front wall portion extending vertically along a front area of the main upright portion, a rear wall portion extending vertically along a rear area of the main upright portion and a lower wall portion extending horizontally along a lower area of the main upright portion from a lower end of the front wall portion to a lower end of the rear wall portion. The main upright portion, the front wall portion, the rear wall portion and the lower wall portion at least partially define a door cavity. The reinforcing structure extends between the front wall portion and the rear wall portion within the door cavity. The reinforcing structure includes a first bracket fixed to at least one of the front wall portion and the main upright portion of the inner door panel and a reinforcing bar having a first end section rigidly fixed to the first bracket. The first end section of the reinforcing bar had a contoured end surface that is spaced apart from adjacent surfaces of the first bracket prior to a side force and deformation test. The contoured end surface is shaped to maximize surface area contact between the first end section of the reinforcing bar and the adjacent surfaces of the first bracket in response to deformation of the first bracket when force is applied from a direction transverse to a lengthwise direction of the reinforcing structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
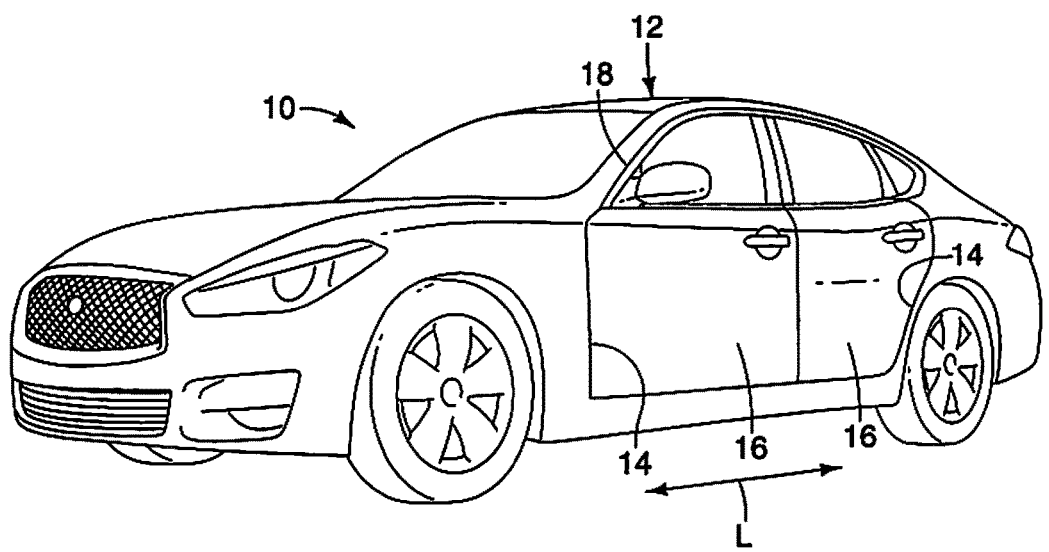
FIG. 1 is a perspective view of a vehicle having a door structure that includes a reinforcing structure, in accordance with a first embodiment.

Referring initially to FIG. 1, a vehicle 10 having a vehicle body structure 12 is illustrated in accordance with a first embodiment. As shown in FIG. 1, the vehicle 10 is a four door sedan. The vehicle body structure 12 defines four door openings 14 and four corresponding door structures 16 that are described in greater detail below. However, it should be understood from the drawings and the description herein, that the door structures 16 can be employed in any of a variety of vehicle designs and configurations, such as a coupe, sports utility vehicle (SUV), a truck, a van or commercial vehicle. Specifically, the shape and contours of the door structures 16 can be changed and modified, and still lie within the scope of this disclosure.

Figure 4:
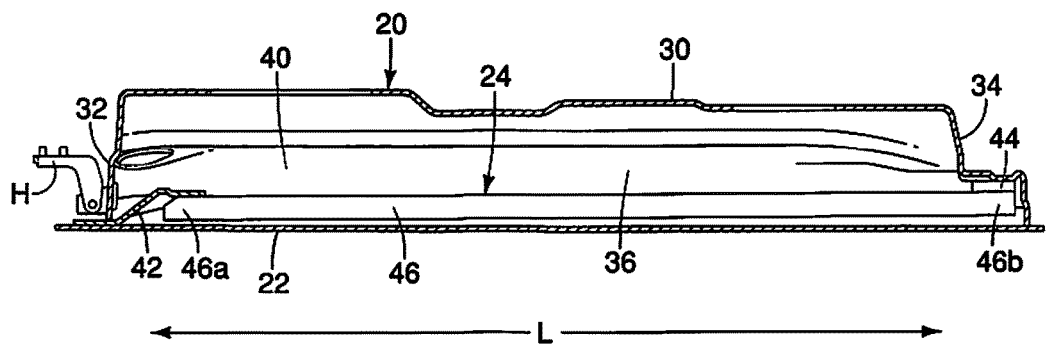
FIG. 4 is a cross-sectional view of the door structure taken along the line 4-4 in FIG. 2, showing the inner door panel, the outer door panel and the reinforcing structure with a door cavity defined between the inner door panel and the outer door panel in accordance with the first embodiment.
Figure 6:
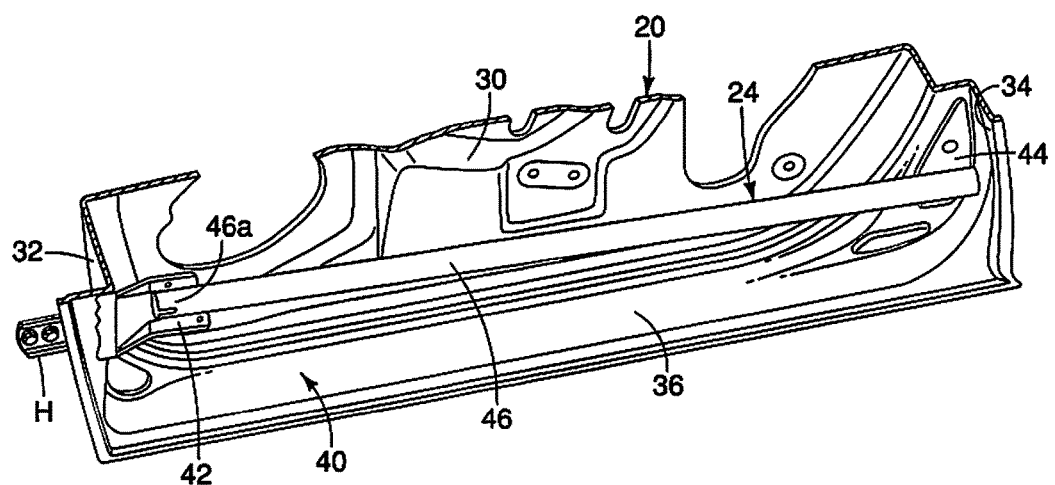
FIG. 6 is a perspective view of a lower portion of the door structure with the outer door panel removed showing the inner door panel and the reinforcing structure within the door cavity, the reinforcing structure having a first bracket, a second bracket and a reinforcing bar in accordance with the first embodiment.

The vehicle body structure includes a pillar 18 that at least partially defines one of the door openings 14. As shown in FIGS. 4 and 6, the door structures 16 include door hinges H having a first part fixedly attached to the pillar 18 and a second part fixedly attached to door structure 16, such that the door structure 16 pivots relative to the vehicle body structure 12 between a closed orientation at least partially covering the corresponding one of the door opening 14 and an open position exposing the corresponding one of the door openings 14.

Since vehicle body structures 12 and features of the vehicle 10 are conventional structures and features, further description is omitted for the sake of brevity.

In the depicted embodiment, there are four door structures 16, two front doors (only one shown) and two rear doors (only one shown). The front doors have slightly different shapes as compared to the rear doors. However, for purposes of understanding the disclosure, only one of the door structures 16 is described in detail for the sake of brevity, since description of one of the door structures 16 applies equally to each of the door structures 16.

Figure 2:
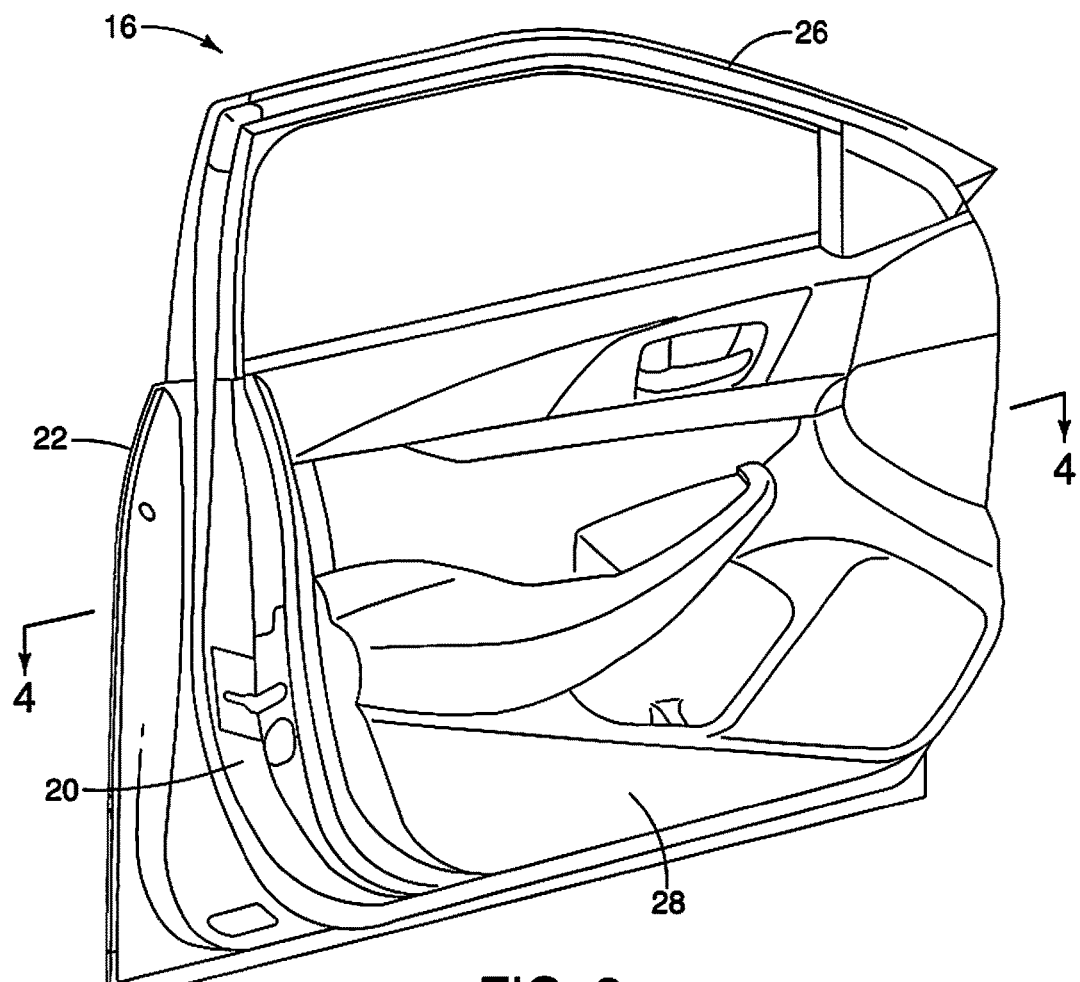
FIG. 2 is a perspective view of the door structure shown removed from the vehicle in accordance with the first embodiment.
Figure 3:
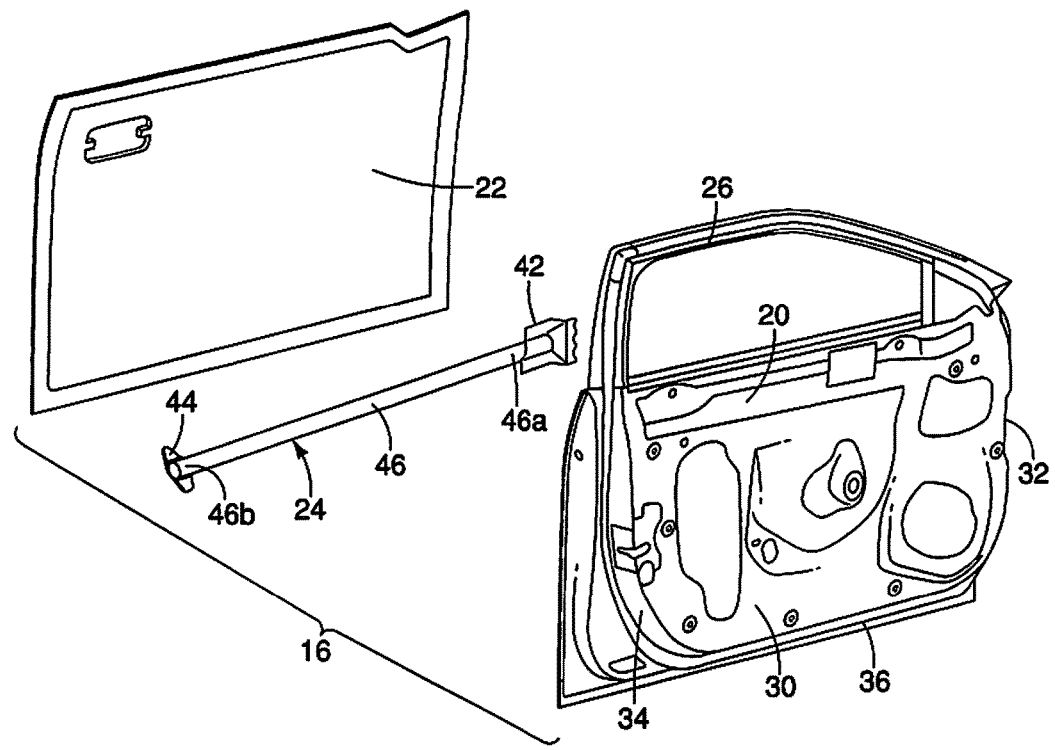
FIG. 3 is an exploded perspective view of the door structure showing an inner door panel, an outer door panel and the reinforcing structure in accordance with the first embodiment.

The door structure 16 is shown removed from the vehicle in FIGS. 2-6. As shown in FIG. 3, the door structure 16 basically includes an inner door panel 20, an outer door panel 22, a reinforcing structure 24 and a window support frame 26. The inner door panel 20, the outer door panel 22 and the reinforcing structure 24 can all be made of or formed from metallic materials. For example, the inner door panel 20 and the outer door panel 22 can be formed from pressed sheet metal, or similar shaping materials. The reinforcing structure 24 can be made of differing metal materials, such as steel, plate steel, and/or hardened steel. The various features of the reinforcing structure 24 are described in greater detail below.

The door structure 16 is shown with trim panels 28 in FIG. 2. The trim panels 28 are conventional vehicle components and are removed in FIGS. 3 and 4. The window support frame 26 is also a conventional structure. Therefore, description of the trim panels 28 and the window support frame 26 is omitted for the sake of brevity. Further, the door structure 16 can include additional features and elements, such as a door latch, door handle, door lock, window regulator mechanism and electric control panel. Description of these features and elements is also omitted for the sake of brevity.

Figure 5:
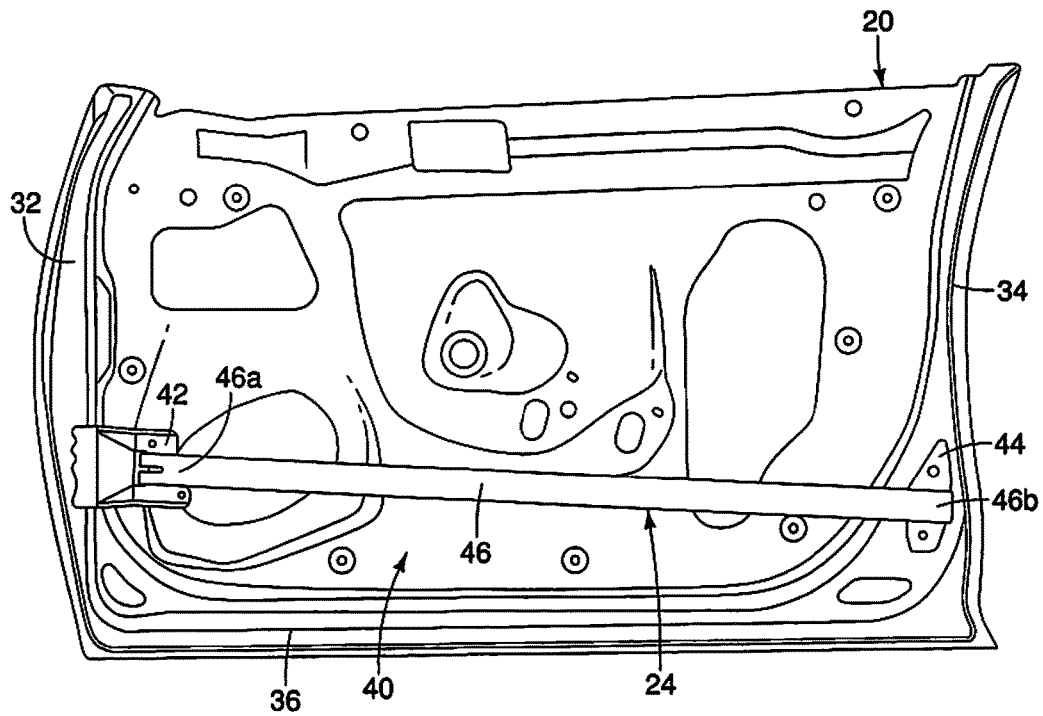
FIG. 5 is a side view of a portion of the door structure with the outer door panel removed showing the inner door panel and the reinforcing structure in accordance with the first embodiment.

As shown in FIGS. 4, 5 and 6, the inner door panel 20 has a main upright portion 30, a front wall portion 32, a rear wall portion 34 and a lower wall portion 36. The main upright portion 30 is a generally planar portion that defines the inner door panel 20. An inboard side of the inner door panel 20 is shown in FIG. 3 and an outboard side of the inner door panel 20 is shown in FIGS. 5 and 6. Various features, such as the trim panels 28 attach to the inboard side of the inner door panel 20. The front wall portion 32 extends vertically along a front area of the main upright portion 30. The rear wall portion 34 extends vertically along a rear area of the main upright portion 30. The lower wall portion 36 extends horizontally along a lower area of the main upright portion 30 from a lower end of the front wall portion 32 to a lower end of the rear wall portion 34. The front wall portion 32, the rear wall portion 34 and the lower wall portion 36 basically extend in an outboard direction from the main upright portion 30. As shown in FIG. 4, the main upright portion 30, the front wall portion 32, the rear wall portion 34 and the lower wall portion 36 at least partially defining a door cavity 40 located along the outboard side of the inner door panel 20 between the inner door panel 20 and the outer door panel 22.

The outer door panel 22 is a conventional door element that is shaped and contoured in accordance with the overall design and shape of the vehicle 10. The depicted embodiment of the outer door panel 22 is shaped and contoured in accordance with the overall design of the vehicle 10 shown in FIG. 1. However, it should be understood from the drawings and the description herein that the outer door panel 22 can have any of a variety of shapes and contours and is not limited to the depicted shapes and contours.

Outer peripheral sides and bottom portions of the outer door panel 22 are fixedly attached to flanges formed along peripheral edges of the front wall portion 32, the rear wall portion 34 and the lower wall portion 36. Specifically, the outer door panel 22 and the inner door panel 20 are fixedly attached to one another further defining the door cavity 40 therebetween. An upper edge of the outer door panel 22 and a corresponding upper edge of the inner door panel 20 are spaced apart from one another in a conventional manner to allow window glass (not shown) to move up and down from an upper, closed location within the window support frame 26 to a fully open location where the window glass is moved into the door cavity 40.

A description of the reinforcing structure 24 is now provided with specific reference to FIGS. 3-16. As shown in FIG. 3, the reinforcing structure 24 includes a first bracket 42, a second bracket 44 and a reinforcing bar 46. The first bracket 42 is fixed to a first end section 46a of the reinforcing bar 46 and the second bracket 44 is fixed to a second end section 46b of the reinforcing bar 46. The first bracket 42 and the second bracket 44 are fixed to the reinforcing bar 46 by, for example, welding techniques.

The reinforcing structure 24 is further fixedly attached to the inner door panel 20. Specifically, the first bracket 42 is fixed to the front wall portion 32 and the second bracket 44 is fixed to the rear wall portion 34. The reinforcing structure 24 is attached to the inner door panel 20 by, for example, welding techniques.

Hence, the reinforcing structure 24 extends between the front wall portion 32 and the rear wall portion 34 within the door cavity 40. The first bracket 42 can also be attached to the outer door panel 22 and/or the main upright portion 30 of the inner door panel 20. However, in the depicted embodiment, the reinforcing bar 46 is spaced apart from both the inner door panel 20 and the outer door panel 22, as shown in FIG. 4.

Figure 7:
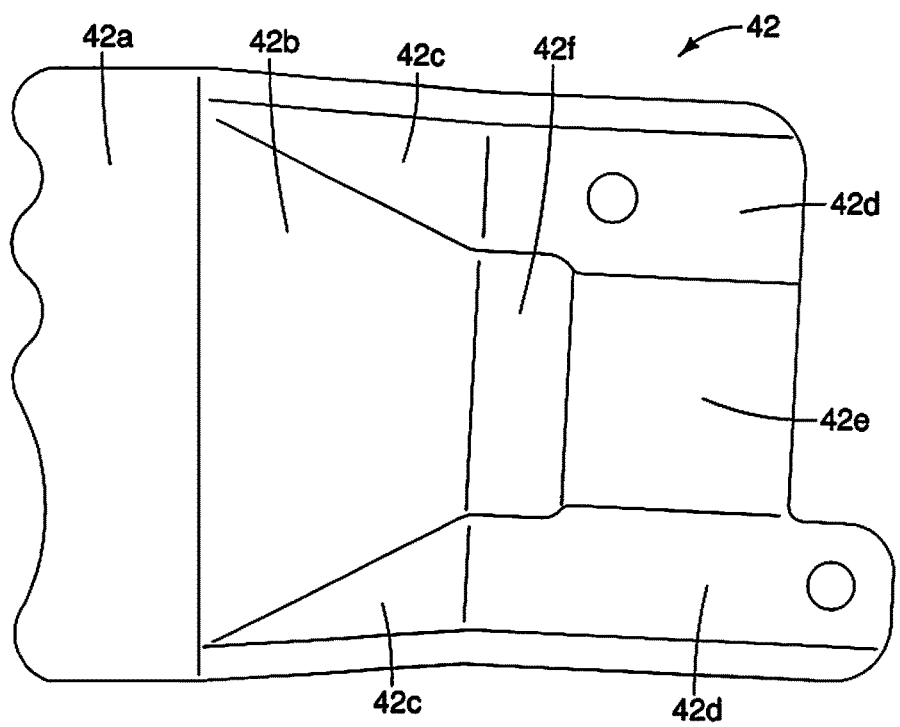
FIG. 7 is a side view of the first bracket of the reinforcing structure shown removed from the reinforcing bar in accordance with the first embodiment.
Figure 8:
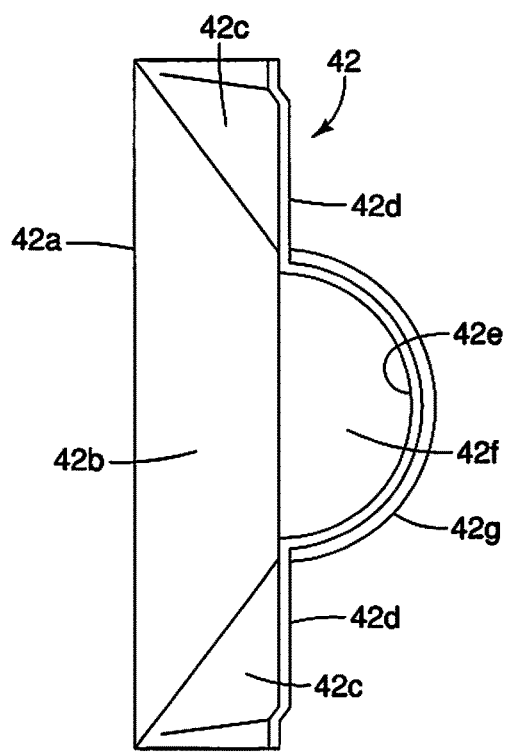
FIG. 8 is a rear view of the first bracket of the reinforcing structure shown removed from the reinforcing bar in accordance with the first embodiment.
Figure 9:
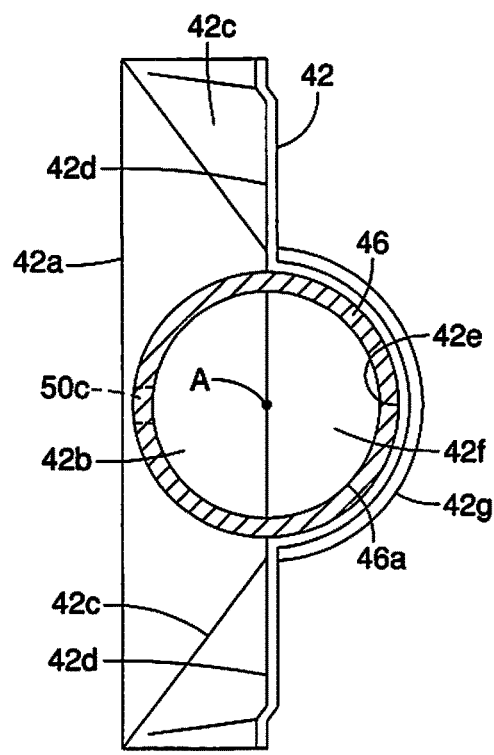
FIG. 9 is another rear view of the first bracket of the reinforcing structure showing attachment to a first end of the reinforcing bar in accordance with the first embodiment.
Figure 10:
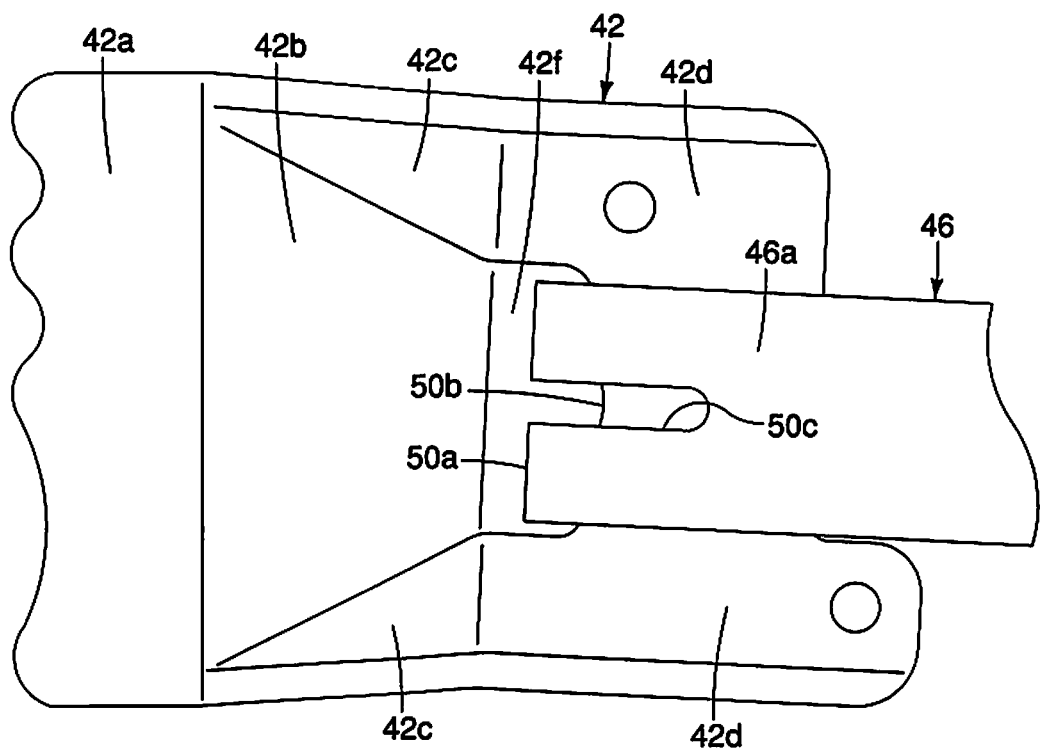
FIG. 10 is another side view of the first bracket of the reinforcing structure showing attachment to the first end of the reinforcing bar in accordance with the first embodiment.
Figure 11:
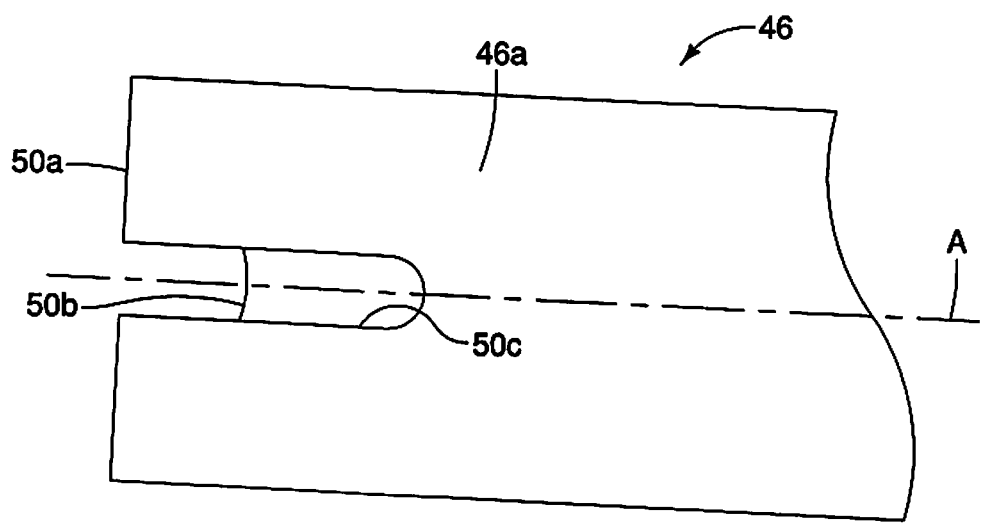
FIG. 11 is a side view of the first end of the reinforcing bar shown removed from the first bracket of the reinforcing structure in accordance with the first embodiment.

As shown in FIGS. 7-9, the first bracket 42 is a contoured plate-like member that can be formed by, for example, pressing sheet metal into the depicted shape. The first bracket 42 includes a flat flange portion 42a, a contoured portion 42b, side contoured portions 42c, flat sections 42d, a curved flange portion 42e and a transition portion 42f. The flat flange portion 42a is a planar section that mates with a surface of the front wall portion 32 of the inner door panel 20 and is welded thereto. The remainder of the first bracket 42 is a contoured section of the first bracket 42 that includes a variety of shaped surfaces shaped to provide rigidity and strength to the first bracket 42. The contoured section of the first bracket 42 includes the contoured portion 42b, the side contoured portions 42c, the flat sections 42d, the curved flange portion 42e and the transition portion 42f.

The contoured portion 42b of the first bracket 42 is inclined relative to the flat flange portion 42a and extends to the transition portion 42f. The contoured portion 42b is generally planar but is not parallel to the flat flange portion 42a. There are two side contoured portions 42c, one on each side of the contoured portion 42b. As shown in FIG. 7, each of the side contoured portions 42c has a triangular shape. As shown in FIG. 8, the side contoured portion 42c and the contoured portion 42b form a trough-like shape, since the side contoured portions 42c are angled relative to the contoured portion 42b. The overall shape and dimensions of the contoured portion 42b and the side contoured portions 42c serves to offset the flat sections 42d, the transition portion 42f and the curved flange portion 42e from the flat flange portion 42a. In other words, the contoured portion 42b, the side contoured portions 42c, the flat sections 42d, the curved flange portion 42e and the transition portion 42f basically define a concaved area relative to the flat flange portion 42a. These shapes also make it possible for the reinforcing bar 46 to be spaced apart from the outer door panel 22, as shown in FIG. 4.

The flat sections 42d have respective surfaces that are co-planar and are parallel to the flat flange portion 42a. The curved flange portion 42e is located between the flat section 42d and has a half-cylindrically shaped surface dimensioned to receive the first end section 46a of the reinforcing bar 46. The curved flange portion 42e receives the first end section 46a of the reinforcing bar 46, as shown in FIG. 9. The first end section 46a of the reinforcing bar 46 is welded to the curved flange portion 42e and consequently the first end section 46a of the reinforcing bar 46 is rigidly fixed to the first bracket 42.

Figure 15:
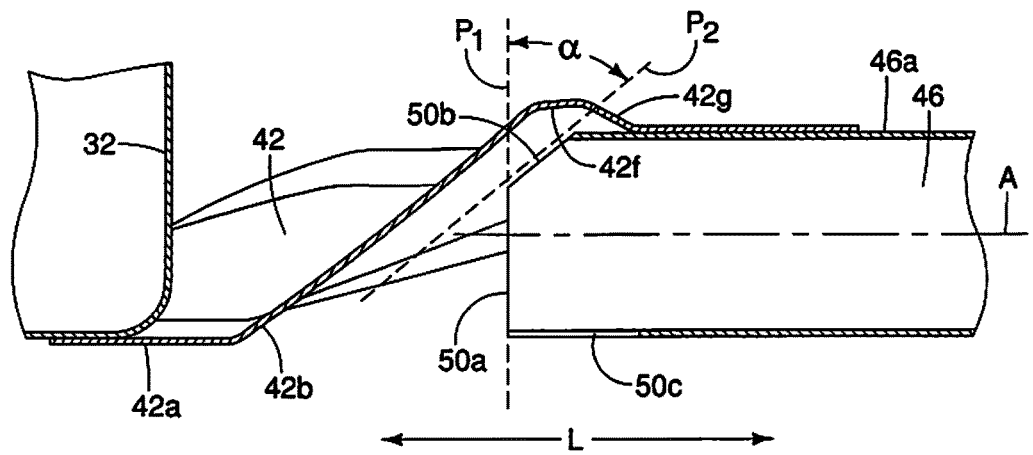
FIG. 15 is a side cross-sectional view of a portion of the reinforcing structure showing the first bracket and the first end of the reinforcing bar in an undeformed state in accordance with the first embodiment.

The transition portion 42f is located between the curved flange portion 42d and the contoured portion 42b. The transition portion 42f is an annular shaped area of the first bracket 42 that defines an outer radius that is larger than the curvature or radius of the curved flange portion 42e. Hence, as shown in FIGS. 8 and 9, an inboard surface 42g of the transition portion 42f is visible. The inboard surface 42g faces the main upright portion 30 of the inner door panel 20 and is also shown in FIG. 15.

A description of the reinforcing bar 46 is now provided with specific reference to FIGS. 9-16. The reinforcing bar 46 is a rigid metallic pipe having a circular cross-section, as shown in FIG. 9. The reinforcing bar 46 defines a lengthwise direction L (FIGS. 1, 4, 15 and 16) that coincides with a lengthwise direction of the vehicle 10 with the door structure 16 in the closed portion. The reinforcing bar 46 also defines a central axis A (FIGS. 11, 12, 15 and 16) that extends therethrough. The reinforcing bar 46 has an overall cylindrical shape throughout its length.

The first end section 46a of the reinforcing bar 46 includes a planar end surface 50a, a contoured end surface 50b and an alignment slot 50c. The planar end surface 50a defines a first plane $P_1$, as shown in FIG. 15, that is perpendicular to the central axis A and the lengthwise direction L of the reinforcing bar 46. The planar end surface 50a is also shown in FIGS. 10-14.

Figure 12:
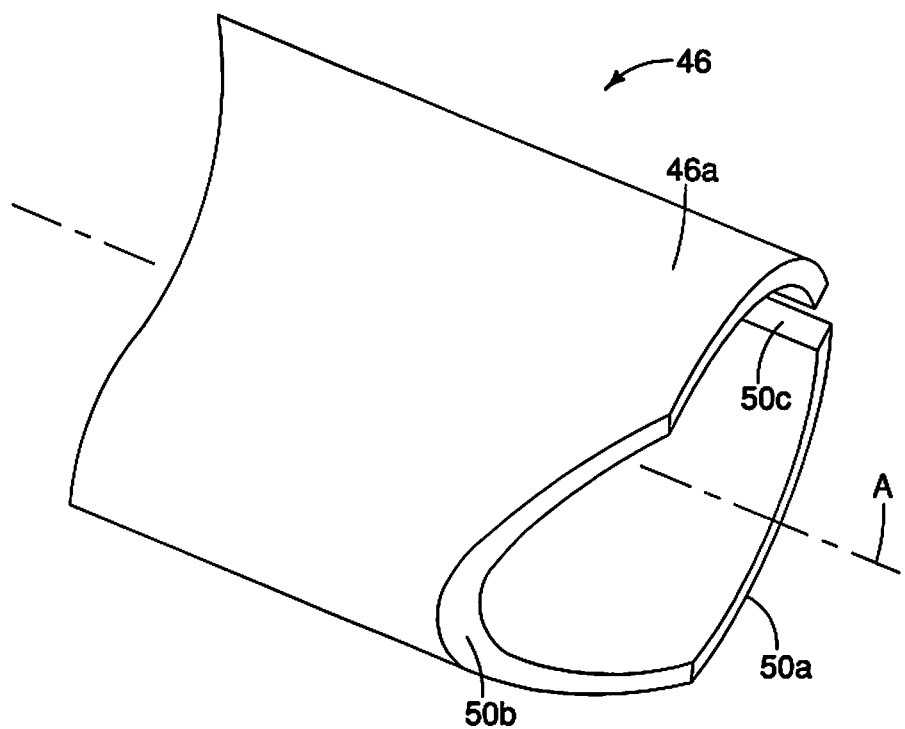
FIG. 12 is a perspective view of the first end of the reinforcing bar showing contoured surfaces thereof in accordance with the first embodiment.
Figure 13:
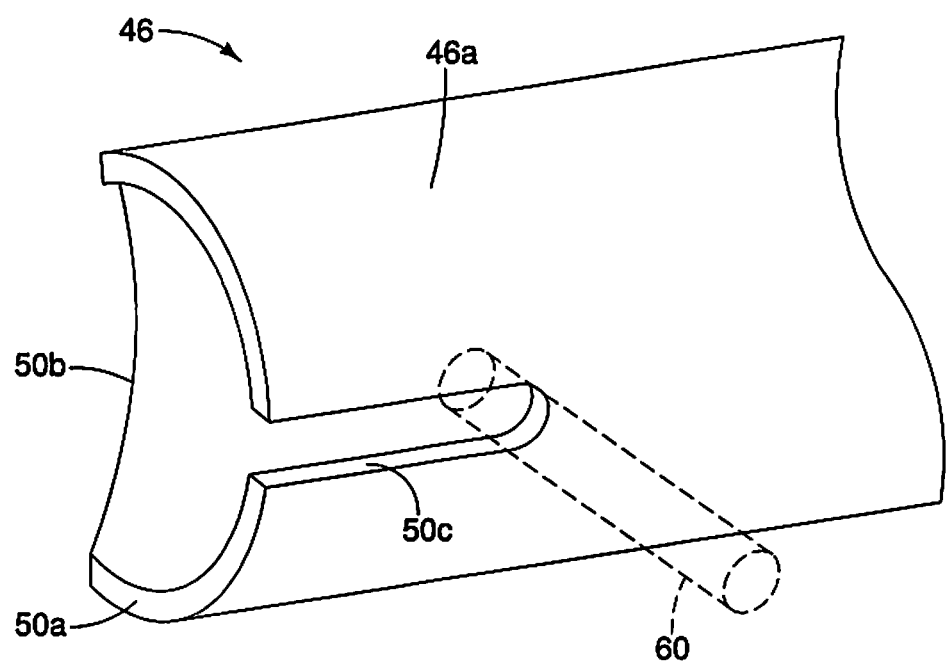
FIG. 13 is another perspective view of the first end of the reinforcing bar showing an alignment slot in accordance with the first embodiment.

The contoured end surface 50b defines a second plane $P_2$ that intersects the first plane $P_1$ and defines and angle α therebetween. The angle α can be anywhere between 35 and 55 degrees. However, in the depicted embodiment, the angle α is approximately 45 degrees. As shown in FIGS. 12 and 13, the contoured end surface 50b has an overall curvature as viewed from sides thereof.

Figure 16:
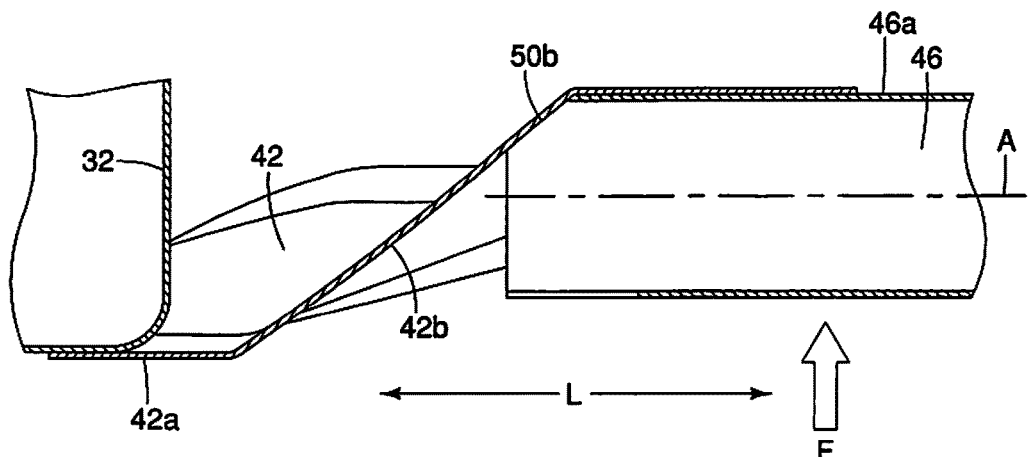
FIG. 16 is another side cross-sectional view of the portion of the reinforcing structure showing the first bracket and the first end of the reinforcing bar in a deformed state after being subjected to force and deformation testing by sufficient force to an outboard side of the reinforcing bar causing the reinforcing bar to move inboard toward the inner door panel in accordance with the first embodiment.

FIG. 15 shows the door structure 16, and more specifically, the reinforcing structure 24, in an undeformed state. The undeformed state corresponds to the condition of the door structure 16 from the factory for normal everyday use. FIG. 16 shows the door structure 16, and more specifically, the reinforcing structure 24, in a deformed state in response to or upon application of sufficient force F acting on the reinforcing bar 24 causing the reinforcing bar 24 to move toward the main upright portion 30 of the inner door panel 20 (a first door panel).

In FIG. 16, the force F has a component that is applied in a direction that is substantially perpendicular to the lengthwise direction L of the reinforcing structure 24, and also perpendicular to the main upright portion 30 of the inner door panel 20.

As shown in FIG. 15, the planar end surface 50a and the contoured end surface 50b of the first end section 46a of the reinforcing bar 46 are spaced apart from adjacent surfaces of the first bracket 42. More specifically, the contoured end surface 50b is spaced apart from the contoured portion 42b, the curved flange portion 42e and the transition portion 42f. As is shown in FIG. 15, the contoured end surface 50b is spaced apart from the contoured portion 42b and the transition portion 42f in the undeformed state. However, in response to application of the lateral force F, the contoured end surface 50b is shaped to correspond with the shape of the contoured portion 42b of the first bracket 42. Specifically, as shown in cross-section in FIG. 15, the plane $P_2$ defined by the contoured end surface 50b is approximately parallel to the contoured portion 42b of the first bracket 42. Hence, upon the application of the sufficient force F (a side lateral force) the contacting surfaces between the reinforcing bar 46 and the first bracket 42 are maximized. More specifically, since all of the contoured surface 50b contacts the contoured portion 42b of the first bracket 42, the force F is distributed along the contoured portion 42b in a maximized orientation, as compared to a reinforcing bar having its entire end being perpendicular to the lengthwise direction L.

As shown in FIG. 16, during the application of the force F, the first bracket 42 is deformed such that the contoured end surface 50b is moved into contact with the contoured portion 42b of the first bracket 42. The force F causes deformation of the first bracket 42 such that the transition portion 42f (see FIG. 15) is generally straightened so that the transition portion 42f appears to become part of or continual with the contoured portion 42b of the first bracket 42.

Figure 17:
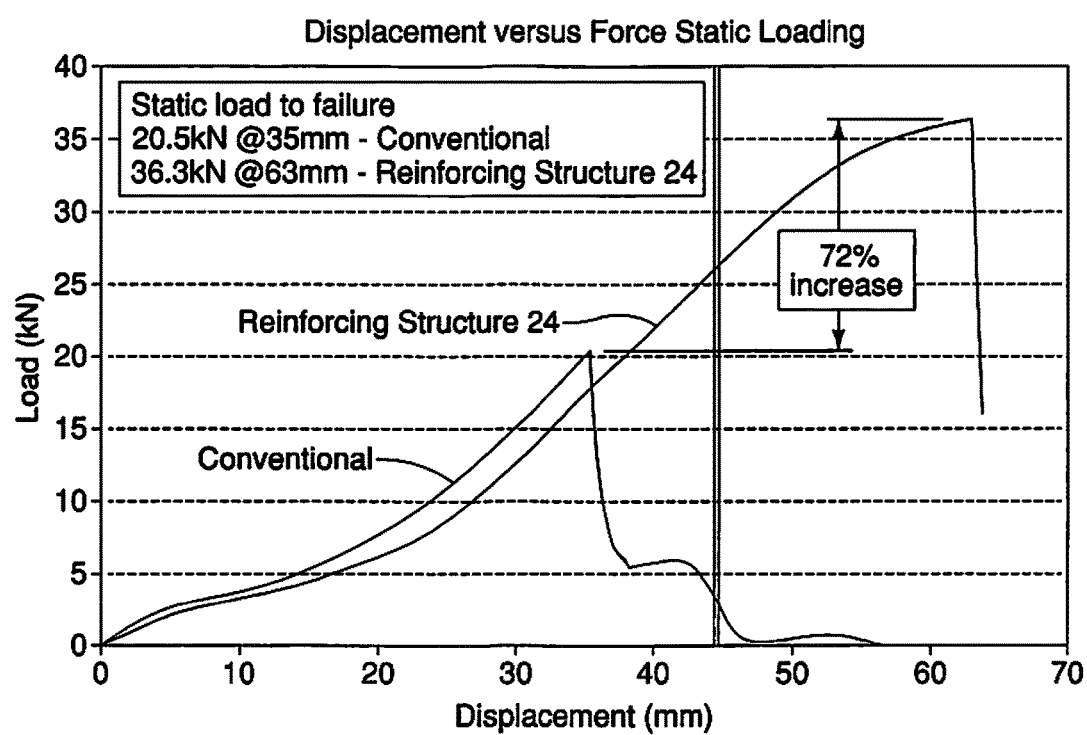
FIG. 17 is a chart showing force and displacement of the reinforcing bar during tests where force is applied to the outboard side of the reinforcing bar causing the reinforcing bar to move inboard toward the inner door panel in accordance with the first embodiment.

FIG. 17 is a chart showing the force F applied to the reinforcing structure 24 and displacement of the reinforcing bar 46 during tests where the force F is applied to the outboard side of the reinforcing bar 46 causing the reinforcing bar 46 to move inboard toward the inner door panel 20.

Figure 14:
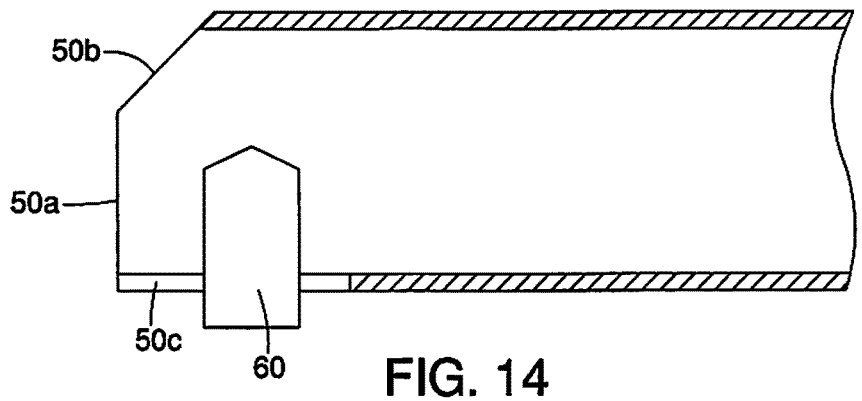
FIG. 14 is a side cross-sectional view of the first end of the reinforcing bar showing an alignment tool inserted into the alignment slot in accordance with the first embodiment.

The alignment slot 50c of the reinforcing bar 46 is provided to ensure proper alignment of the reinforcing bar 46 with the first bracket 42 during assembly thereof. The alignment slot 50c is formed at the first end section 46a opposite the contoured surface 50b. During the assembly and welding of the first bracket 42 to the first end section 46a of the reinforcing bar 46, an alignment tool 60 is inserted into the slot 50c to position it relative to the first bracket 42, as shown in FIGS. 13 and 14. The alignment tool 60 is preferably held in place within the slot 50c normal to a plane defined by the flat flange portion 42a of the first bracket 42, with the first end section 46a of the reinforcing bar 46 installed within the curved flange portion 42e of the first bracket 42. The alignment tool 60 is removed after the first bracket 42 and the reinforcing bar 46 are welded to one another. As shown in FIGS. 9 and 12-15, the slot 50c is spaced apart from a center of the contoured end surface 50*b* by 180 degrees as viewed in an end view of the reinforcing bar.

The various features of the vehicle 20 other than the features of the door structures 16 described above, are conventional components that are well known in the art. Since such features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door structure. Accordingly, these terms, as utilized to describe the present invention should be interpreted relative to a vehicle equipped with the vehicle door structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door structure comprising:
   a first door panel having a main upright portion, a front wall portion extending vertically along a front area of the main upright portion, a rear wall portion extending vertically along a rear area of the main upright portion and a lower wall portion extending horizontally along a lower area of the main upright portion from a lower end of the front wall portion to a lower end of the rear wall portion, the main upright portion, the front wall portion, the rear wall portion and the lower wall portion at least partially defining a door cavity; and
   a reinforcing structure extending between the front wall portion and the rear wall portion within the door cavity, the reinforcing structure including a first bracket fixed to at least one of the front wall portion and the main upright portion of the first door panel and a reinforcing bar having a first end section rigidly fixed to the first bracket, the first end section of the reinforcing bar having a contoured end surface that is spaced apart from adjacent surfaces of the first bracket when the first bracket is in an undeformed state, the contoured end surface being shaped to correspond with a shape of the first bracket and maximize surface area contact between the first end section of the reinforcing bar and the adjacent surfaces of the first bracket when the first bracket is moved to a deformed state upon application of sufficient force acting on the reinforcing bar in a direction causing the reinforcing bar to move toward the main upright portion of the first door panel.

2. The vehicle door structure according to claim 1, wherein
   the first bracket includes a planar section and a contoured section, the planar section being fixedly attached to the front wall portion, the contoured section including a concave area and a half-cylindrically shaped area, the half-cylindrically shaped area receiving and being rigidly fixed to the first end section of the reinforcing bar, with the contoured end surface extending across from and facing the contoured section of the first bracket.

3. The vehicle door structure according to claim 1, wherein
   the reinforcing bar has an overall cylindrical shape throughout its length.

4. The vehicle door structure according to claim 1, wherein
   the reinforcing bar defines a central axis extending in a lengthwise direction of the reinforcing bar, and
   the first end section includes a main end surface and the contoured end surface, the main end surface defines a first plane that is perpendicular to the central axis and edge portions of the contoured end surface define a second plane that intersects the first plane such that a first angle is defined between the first plane and the second plane.

5. The vehicle door structure according to claim 4, wherein
   the first angle being between 35 and 55 degrees.

6. The vehicle door structure according to claim 5, wherein
   the first angle is 45 degrees.

7. The vehicle door structure according to claim 4, wherein
   the contoured end surface has an overall curvature as viewed from a side perpendicular to the second plane.

8. The vehicle door structure according to claim 4, wherein
   the first end section of the reinforcing bar includes an alignment slot that extends from the main end surface along the first end section perpendicular to the first plane, the alignment slot being spaced apart from the contoured end surface.

9. The vehicle door structure according to claim 8, wherein
the alignment slot being spaced apart from a center of the contoured end surface by 180 degrees as viewed in an end view of the reinforcing bar.

10. The vehicle door structure according to claim 1, wherein
the main upright portion includes an upper edge that at least partially defines a window opening.

11. The vehicle door structure according to claim 1, further comprising
a second door panel attached to the front wall portion, the rear wall portion and the lower wall portion of the first door panel with the door cavity being at least partially confined between the first door panel and the second door panel.

12. The vehicle door structure according to claim 11, wherein
the first door panel is an inner door panel and the second door panel is an outer door panel.

13. The vehicle door structure according to claim 1, wherein
the reinforcing structure includes a second bracket rigidly fixed to the rear wall portion and a second end section of the reinforcing bar.

14. The vehicle door structure according to claim 1, further comprising
a vehicle body structure including a pillar that at least partially defines a door opening;
a door hinge having a first part fixedly attached to the pillar and a second part fixedly attached to the front wall portion of the first door panel such that the first door panel pivots relative to the vehicle body structure between a closed orientation at least partially covering the door opening and an open position exposing the door opening.

15. The vehicle door structure according to claim 1, wherein
the adjacent surfaces of the first bracket are positioned between the first door panel and the contoured end surface of the reinforcing bar in the undeformed state.

* * * * *